(No Model.)
M. A. LINNELL.
SPROCKET DRIVE CHAIN.
No. 562,629. Patented June 23, 1896.
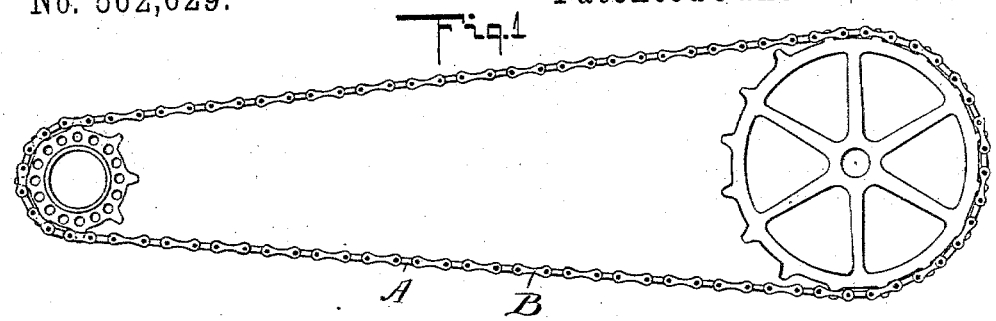
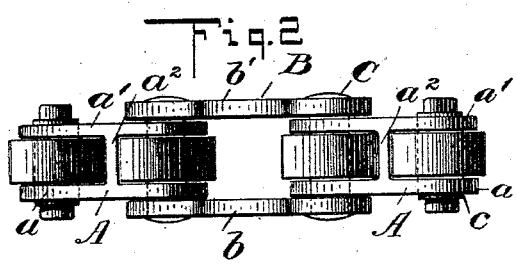
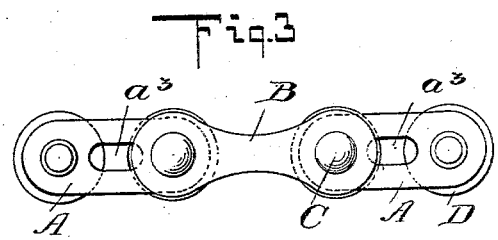
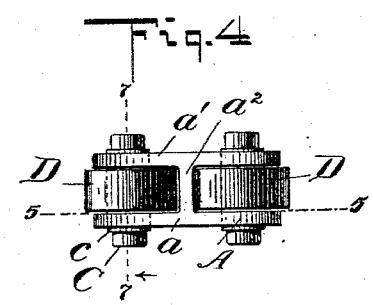
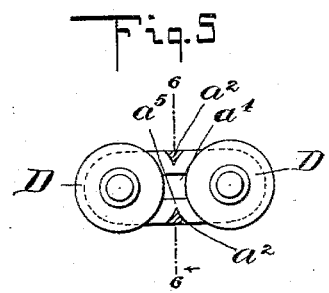
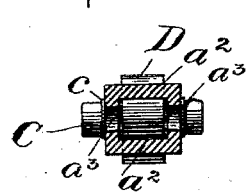
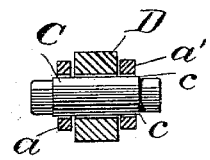
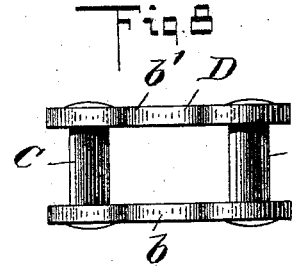
Witnesses:
Edmund A. Strange
George Barry Jr.
Inventor
Moses A. Linnell,
by attorneys,
Brown & Seward

UNITED STATES PATENT OFFICE.

MOSES A. LINNELL, OF MOOSUP, CONNECTICUT.

SPROCKET DRIVE-CHAIN.

SPECIFICATION forming part of Letters Patent No. 562,629, dated June 23, 1896.

Application filed February 25, 1896. Serial No. 580,711. (No model.)

*To all whom it may concern:*

Be it known that I, MOSES A. LINNELL, of Moosup, in the county of Windham and State of Connecticut, have invented a new and useful Improvement in Sprocket Drive-Chains, of which the following is a specification.

My invention relates to an improvement in sprocket drive-chains, one object being to construct a chain which will drive with a minimum amount of friction and in which the parts are so assembled that they cannot bind or cramp and will therefore be very durable.

A further object is to construct the inner link of the chain of one piece and mount the antifriction-rollers therein, the said inner link being substantially of double-yoke form.

A further object is to so construct the chain that the inner links will be short ones and the outer links the long ones, so that the teeth of the sprocket-wheel will enter the space between the adjacent ends of two inner links, the antifriction-rollers being projected into the said space, so that the teeth upon the sprocket-wheel are caused to engage the said rollers and not the ends of the inner links.

A practical embodiment of my invention is represented in the accompanying drawings, in which—

Figure 1 is a view in side elevation of my improved drive-chain, showing the same engaged by two sprocket-wheels. Fig. 2 is a top plan view, on an enlarged scale, of two inner links and their connecting outer link. Fig. 3 is a side view of the same. Fig. 4 is a top plan view of the inner link and the antifriction-rollers carried thereby. Fig. 5 is a longitudinal vertical section through the inner link on the line 5 5 of Fig. 4. Fig. 6 is a transverse section through the inner link on the line 6 6 of Fig. 5. Fig. 7 is a transverse section through the inner link on the line 7 7 of Fig. 4; and Fig. 8 is a top plan view of one of the outer connecting-links, to which the journal-pins are rigidly secured.

The inner links as a whole are denoted by A and are of double-yoke form, their opposite sides $a$ $a'$, between which the antifriction-rollers are mounted, being spaced rigidly apart by a centrally-located cross-brace $a^2$. The sides and cross-brace are preferably formed in one piece, and, for the sake of lightness, may be milled out, as shown at $a^3$ $a^4$ $a^5$. When so milled out, the cross-brace assumes the form of cross-bars spaced apart, as shown in Fig. 5. These inner links A are connected by outer links B, which links consist of side plates $b$ $b'$. These side plates are rigidly spaced apart by the journal-pins C, which extend through the inner links A. These journal-pins are provided with shoulders $c$ slightly beyond the exterior of the sides $a$ $a'$, so that when the side plates of the outer links are secured against said abutments on the pins, preferably by upsetting the ends of the pins, the inner links are free to swing easily on the said pins.

The antifriction-rollers, which, in the present form of my invention, form bearings for the teeth of the sprocket-wheel, are denoted by D, and they are loosely mounted on the journal-pins C, between the sides of the inner links A. These rollers are of such size that they extend beyond the ends of the sides of the inner links into the space between the side plates of the outer links, so that the teeth upon the sprocket-wheels bear upon the said rollers, but do not touch the ends of the inner links. By this construction the rollers may be made very narrow, and consequently the journal-pins C may be made much shorter, thereby obviating any liability on the part of the said pins to bend or break.

By causing the teeth to enter the outer link, rather than the inner link, I am enabled to make the chain much narrower, without reducing the thickness of the teeth, as the sides of the outer link will guide the sprocket-teeth to the center of the link and cause them to engage only the roller-surface.

By spacing the sides of the inner link rigidly apart by the cross-brace $a^2$, and by securing the sides of the outer link rigidly to the journal-pins C, it will be seen that the several links of the chain are absolutely rigid, and there is no tendency on the part of either side of the chain to draw and thereby skew the rollers.

It is evident that slight changes might be resorted to in the form and arrangement of the several parts herein described without departing from the spirit and scope of my invention. Hence I do not wish to limit myself strictly to the structure herein set forth; but

What I claim is—

1. A chain, comprising a series of connected links each alternate link being formed of sides rigidly spaced apart by a centrally-located cross-brace and rollers carried by the said alternate links in their opposite ends, substantially as set forth.

2. A chain comprising a series of inner links and a series of outer links, the sides of the inner links being spaced apart by centrally-located cross-braces, journal-pins passing through the ends of the inner and outer links for connecting them and antifriction-rollers mounted on the said journal-pins between the sides of the inner links, substantially as set forth.

3. A chain, comprising a series of inner links and a series of outer links, the sides of the inner links being spaced apart by centrally-located cross-braces, journal-pins passing through the ends of the inner and outer links and secured rigidly to the outer links and antifriction-rollers mounted on the said journal-pins between the sides of the inner links, the said rollers projecting into the spaces in the outer links, substantially as set forth.

4. A chain comprising a series of connected links each alternate link being formed of sides rigidly spaced apart by a centrally-located cross-brace, journal-pins passing through the ends of consecutive links and secured rigidly to the outer links and bearings on the journal-pins intermediate of the ends of the links provided with the centrally-located cross-braces, said bearings projecting into the spaces in the adjacent links, substantially as set forth.

MOSES A. LINNELL.

Witnesses:
   CHAS. N. ALLEN,
   A. B. SHEPARDSON.